United States Patent [19]

Brendel

[11] Patent Number: 4,644,860

[45] Date of Patent: Feb. 24, 1987

[54] METHOD OF CONTROLLING THE LINE PRESSURE DISTRIBUTION IN A ROLL ARRANGEMENT

[75] Inventor: Bernhard Brendel, Grefrath, Fed. Rep. of Germany

[73] Assignee: Eduard Küsters Maschinenfabrik GmbH & Co. KG, Krefeld, Fed. Rep. of Germany

[21] Appl. No.: 712,662

[22] Filed: Mar. 18, 1985

[30] Foreign Application Priority Data

Mar. 20, 1984 [DE] Fed. Rep. of Germany ....... 3410136

[51] Int. Cl.⁴ .................. B30B 13/00; B30B 3/04
[52] U.S. Cl. ........................ 100/35; 100/47; 100/49; 100/170; 100/162 B; 29/116 AD; 72/16; 72/243
[58] Field of Search .................. 100/35, 47, 49, 168, 100/169, 170, 162 B; 29/113 AD, 116 AD; 72/16, 243, 245

[56] References Cited

U.S. PATENT DOCUMENTS

| | | | |
|---|---|---|---|
| 3,667,380 | 6/1972 | Schlunke et al. | 100/170 X |
| 3,691,940 | 9/1972 | Hays et al. | 100/47 X |
| 4,074,624 | 2/1978 | Biornstad et al. | 100/170 X |
| 4,400,957 | 8/1983 | Carlstedt et al. | 72/243 X |
| 4,458,515 | 7/1984 | Imai | 72/243 X |
| 4,480,452 | 11/1984 | Schnyder | 100/162 B |

Primary Examiner—Peter Feldman

[57] ABSTRACT

In a roll arrangement a control device is applied with information concerning the width of the web, and the pressure profile to be applied to the web, and the average pressure to be applied to the web. Control signals are generated provided to support elements which support a rotatable shell of a roll on a fixed beam to create an appropriate nip pressure.

15 Claims, 3 Drawing Figures

METHOD OF CONTROLLING THE LINE PRESSURE DISTRIBUTION IN A ROLL ARRANGEMENT

BACKGROUND OF THE INVENTION

This invention relates to the control of pressure in a roll, and more particularly relates to a method of and apparatus for controlling the linear pressure, or nip pressure distribution in a roll arrangement.

It has been proposed to control the linear pressure, or nip pressure, distribution in roll arrangements for the pressure treatment of webs of material. In a typical arrangement of this type at least one roll is provided which comprises a stationary beam extending axially of the roll and a shell rotatable therearound, the shell being supported internally on the beam with a number of supporting elements being located between the beam and the shell at positions disposed consecutively along the shell. The supporting elements can exert a pressure against the inner surface of the shell, thus controlling the linear, or nip, pressure exerted by the roll against a mating roll. In the prior proposed device a property of the web is measured after the web has passed through the nip and the measured value is compared with a reference value to produce controller adjusting signals which control the pressures exerted by the various supporting elements.

The pressure exerting supporting elements may be hydraulically operated.

In one particular prior proposed arrangement disclosed in No. DE-OS-2555677, stationary or mobile measuring elements are provided which extend transversely to the web, and which are adapted to detect particular properties thereof such as web thickness or web density or web moisture. The output from the measuring elements is fed to a computer which compares the actual measured properties with a programmed set of values which can be considered to be a property profile, representing the desired profile of the property being measured when considered transversely of the web. For example, the property profile may be a uniform distribution across the web. The computer produces the control or adjusting signals for adjusting the pressure exerted by the supporting members, thus serving to control the forces operative on the shell inner periphery, in response to the differences between the measured property and the programmed property profile.

The known system uses a roll assumed to be known per se from DE-AS No. 2230139. The supporting elements are hydrostatic pistons which are guided inclinedly in bores in the beam and which apply the linear or nip pressure. Systems disclosed by U.S. Pat. No. 3,119,324 and DE-OS No. 1461066 are also of interest. However, the term "supporting elements" is intended to be understood in the present context very broadly as denoting elements for local pressure control. Consequently, rolls according to DE-PS No. 2325721, wherein a piston acts on the side remote from the nip on the shell inner periphery, and rolls in accordance with DE-PS No. 2332861, wherein a piston is disposed in a chamber filled with hydraulic fluid and applies discrete additional forces, and rolls in accordance with DE-PS No. 3003395, in which no additional pressure is applied by a piston element but instead there is a chamber filled with a hydraulic liquid which exerts an overall pressure and means are provided for reducing the pressure, in selected locations, below the pressure of the surrounding hydraulic liquid, are suitable for the invention.

The control system known from DE-OS No. 2555677 (discussed above) starts from the assumption that the web has a particular width relatively to the roll. The pressures exerted by the discrete supporting elements are therefore calculated on the basis of this assumption. However, if this prior proposed system is used to process a web which is not of the desired width, the pressure control is wrong and the web is subject to an incorrect pressure profile.

For the purpose of explanation it will be assumed, as an example, that the web to be processed is narrower than the web originally intended. In this event parts of the roll which would engage the originally intended web now project beyond the edges of the narrow web and bend to some extent over such edges since the roll meets no opposing forces beyond the web edges. The forces applied to the shell in the outermost zones of the roll are applied additionally to the edge zones of the narrow web, and so there is a considerable increase in pressure at such edges. If webs which are not of the standard width are used, whilst the arrangement of the supporting elements in the roll still remains the same, the or each outermost supporting element is at times exerting pressure on parts of the web and at times exerting pressure on an empty space, depending on the width of the web being used at any specific instant.

The extent to which the applied pressure pattern at the edge of a narrow web varies from the required pressure pattern of a standard width web depends, of course, very greatly on the bending resistance of the shell of the roll. A very rigid shell retains its shape in the edge zone, even if no reactionary forces are being applied by the web, whereas a more flexible shell which is bent down beyond the edge of the web and is responsible for an abrupt increase in the pressure at the edge of the web.

It is relatively common for rolls of the kind used in the invention to have to deal with different web widths for instance. when webs from various origins have to be treated in converting or upgrading plants at locations separate from the manufacturing plants. The webs may be paper or plastics or other webs. At the present time it is only possible to treat webs of different widths on a particular machine by permitting departures from a predetermined linear pressure profile.

SUMMARY OF THE INVENTION

The present invention seeks to provide a method of controlling the pressure in a roll, and a roll arrangement, in which the above described disadvantages of the prior art are obviated or reduced.

According to one aspect of this invention there is provided a method of controlling the linear or nip pressure distribution in a roll arrangement adapted for the pressure treatment of a web of material, said roll arrangement comprising at least one roll comprising a stationary beam extending axially of the roll and having a shell rotatable therearound, the shell being mounted relatively to the beam by means of a plurality of supporting elements spaced consecutively along the beam and adapted to apply pressure to the shell to control the line or nip pressure of the roll arrangement, said method including the step of determining a pressure profile to be applied to the web, and providing signals representative of the profile to be applied to the web, and providing signal representative of the profile to control signal generating means, to generate signals to control the pressure applied to the web by the supporting elements, and including the step of indicating the width of the web to the means which produce the control signals so that the control signal producing means will automatically create appropriate control signals having regard to the width of the web.

The pressure profile to be applied to the web may be programmed into the control signal generating means.

Thus, in utilising a method in accordance with the invention, the width of a web to be treated by the roller arrangement can be programmed into the control signal generating means, which will then generate the appropriate control signals to produce the desired pressure profile on the web. Also the programming may be achieved by operating a plurality of handactuated control elements to select the pressure to be applied at predetermined positions spaced transversely across the web. In calculating the pressures applied to the individual support elements due regard will be taken of the properties of the shell, such as its flexibility and the arrangement and construction of the supporting elements. When the method is actually practised, once the apparatus utilised has been adjusted as regards the level of the pressure applied and the nature of the pressure profile to be applied, when a different web width is utilised it is only necessary for a single adjustment to be made, adjusting the programming of the width of the web to the control signal generating means, or in certain embodiments the width of the web may be monitored automatically, appropriate signals being fed automatically directly to the control signal producing menas.

Alternatively the method may comprise the step of measuring the property of the web at predetermined positions spaced transversely across the web after it has passed through the nip of the roll arrangement to establish a measured property profile, and automatically calculating therefrom the pressure profile to be applied to the web.

In one embodiment the width of the web is indicated to control signal producing means by actuating a hand-operated control element, but in an alternative embodiment the width of the web is automatically measured by sensor means which produce a signal representative of the width of the web, said signal being passed to the control signal producing means.

According to another aspect of this invention there is provided an apparatus for controlling the linear nip or pressure distribution in a roll arrangement for the pressure treatment of webs of material, said arrangement comprising at least one roll having a stationary beam extending axially of the roll and a shell rotatable therearound, the shell being mounted relatively to the beam by means of a plurality of supporting elements spaced consecutively along the beam and adapted to apply pressure to the shell to control the line or nip pressure of the roll arrangement, the apparatus further comprising means for determining a pressure profile be applied to the web, means for providing signals representative of the profile to a control signal generating means, adapted to generate signals to control the pressure applied to the web by the supporting elements, and means for indicating the width of the web to the control signal producing means, the control signal producing means being adapted to create appropriate control signals automatically having reqard to the width of the web.

For any specific pressure profile to be applied to a web of a predetermined width in the nip of the roll, there will be a corresponding supporting force profile, the supporting force profile being a profile of the pressures applied to the individual supporting elements to create the desired pressure profile in the nip. There is a significant difference between these two profiles. For instance, if the supporting force profile is altered just at one place, i.e. the pressure of the hydraulic fluid provided to one supporting element is altered, because of the tubular rigidity of the shell the linear pressure profile alters over the whole width of the web. Thus, in a preferred apparatus in accordance with the invention the control signal producing means is in the form of a computer utilising a computing model which includes both the tube rigidity and the resultant deformation of the web in the nip in calculating the profile of the forces to be applied to the support elements. Thus, in a preferred embodiment of the invention, the discrete hydraulic fluid pressures to be supplied to the various supporting elements are calculated in an appropriate manner from the desired linear pressure profile and the width of the web to be treated by the apparatus.

In one embodiment means are provided for pre-programming of the profile to be applied to the web, and said pre-programming means may comprise a plurality of elements which may be positioned to indicate the pressure to be applied to respective regions of the web. Preferably said elements comprise slidable elements which are disposed one beside the other to move in parallel directions so that the slidable elements provide a visual representation of the pressure to be applied to the web when the slidable elements are in position.

In an alternative embodiment means are provided for measuring a property of the web at predetermined positions spaced transversely across the web to establish a measured property profile, and means are provided for automatically calculating therefrom the pressure profile to be applied to the web.

In one embodiment the means for indicating the width of the web to the control signal producing means comprise a hand-operated control element, and in an alternative embodiment the means for indicating the width of the web to the control signal producing means comprise sensor means which automatically measure and produce signals representative of the width of the web, said signals being passed to the control signal producing means.

Preferably means are provided for adjusting the basic linear pressure to be applied, said control signal generating means generating signals which effect local variations of the applied linear pressure.

Advantageously display means are provided on which the pressures applied at predetermined regions of the web may be visually represented. This enables a quick visual check of the applied pressure to be made.

BRIEF DESCRIPTION OF THE DRAWINGS

In order that the invention may be more readily understood, and so that further features thereof may be appreciated, the invention will now be described by way of example with reference to the accompanying drawings in which.

DETAILED DESCRIPTION

Figure 1:
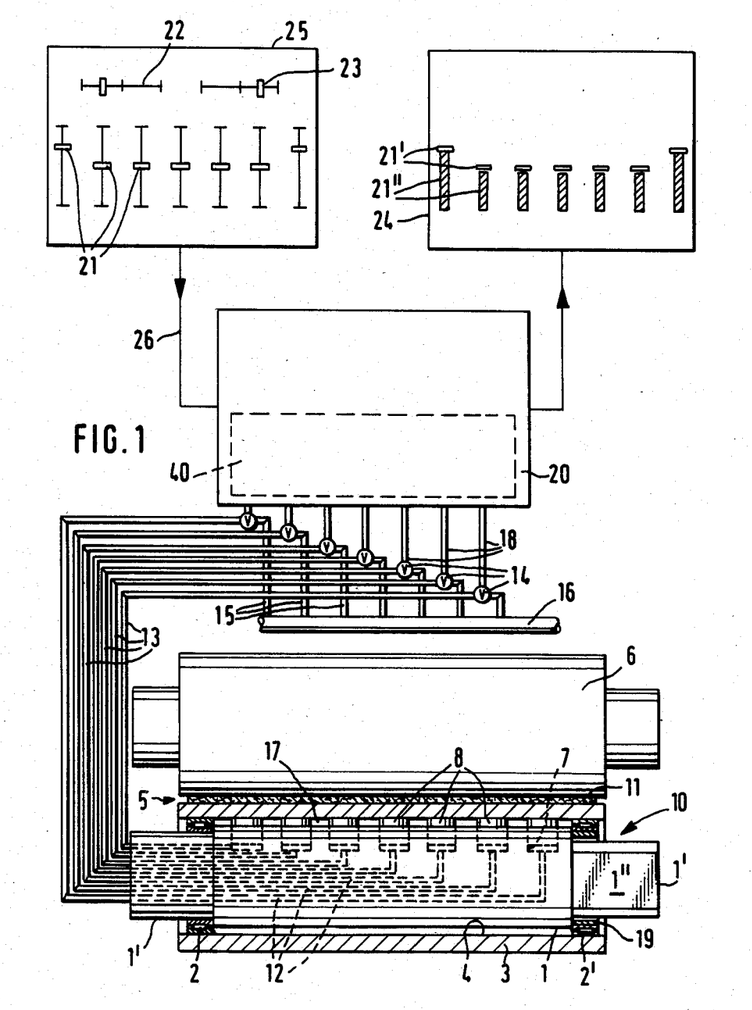
FIG. 1 is a diagrammatic representation of an apparatus in accordance with the invention.

Referring initially to FIG. 1, a roll 10 comprises a stationary beam 1 which extends axially of the roll, and which also extends transversely of a web which is to be treated by the roll. Adjacent the opposed ends of the stationary beam 1, bearings 2 are provided which support a cylindrical shell 3 such that it can rotate about the axis defined by the beam. The inner periphery 4 of the shell is spaced, all round, from the outer periphery of the beam 1.

The beam 1 is provided with projecting end portions 1' which extend beyond the shell 3 and form journals by way of which forces can be applied to the roll 10, or form journals by means of which the roll 10 can be mounted in a roll stand.

The structure of the projecting beam ends 1' is shown most clearly at the right hand side of FIG. 1. The projecting beam end 1' is provided with two facets on opposite sides of the beam, the facets being parallel to the operative plane. Thus the facets are vertical in the orientation shown in FIG. 1. A guide ring 19, of appropriate configuration, is engaged with the projecting beam end so as to be movable with the beam. However, the ring cannot rotate about the beam. The ring supports the bearing, shown as bearing 2' at the right hand side of FIG. 1, on which the shell 3 is mounted. The shell will thus move with the beam but is free to rotate relative to the beam.

In actual fact the roll 10 is constructed identically at both ends thereof.

In the embodiment illustrated the described roll 10 forms a nip 5 by cooperating with a superimposed mating roll 6. Thus the mating roll 6 is disposed above the roll 10 with the periphery thereof located immediately adjacent the periphery of the roll 10, thus defining the nip 5. A web 11 is illustrated passing through the nip 5, and it can be seen that the web 11 is being given a pressure treatment. The web 11 may be, for example, a paper web, and it is to be understood that, for the sake of clarity of illustration, the web thickness is significantly exaggerated in the drawings.

In the beam 1 of the roll 10, on the side of the beam facing towards the nip 5, a plurality of cylindrical bores 7 are provided which extend into the beam. The bores 7 are located in a spaced-apart relationship along the beam 1. Radially movable pressure exerting or supporting elements 8, in the forms of pistons, are located in the bores 7. The elements 8 are shown in the drawings as simply being cylindrical members, but their individual construction can be more elaborate.

Hydraulic fluid feed lines are located in the beam 1, extending to the various cylindrical bores 7. The feedlines are in the form of longitudinal bores in the otherwise solid steel body of the beam 1.

The feed lines 12 of the embodiment shown extend into the roll interior from one side thereof, but it is to be understood that in other embodiments the feed lines can extend into the roll interior from both sides thereof. The lines 12 enable hydraulic fluid to be supplied to each bore 7, to apply a force or pressure to the appropriate piston 8. The piston 8 will then impart that force or pressure to the inner periphery of each shell 3 of the roll 10, and the shell will then exert a corresponding pressure in the nip. The plurality of lines 12 enable each individual element 8 to be subjected to a pre-selected individual hydraulic pressure, so that the various elements 8, which are identical to each other, may apply different forces to the inner periphery of the shell 3.

With any specific selection of pressures being supplied to the elements 8 a particular linear pressure distribution will be provided in the nip 5.

Some of the hydraulic fluid supplied through the lines 12 passes through a narrow duct in each element 8 (not shown) to a shallow chamber which is disposed on that side of each element 8 facing towards the inner periphery 4 of the shell 3, and hydrostatic pressure builds up in this shallow pressure chamber to enable most of the forces applied to the element 8 to be transmitted to the inner periphery 4 of the shell 3. As the shell rotates the inner periphery 4 thereof slides past the elements 8, and consequently there will always be some leakage of fluid between the edges of the elements 8 and the inner periphery 4 of the shell 3. This leaked fluid may collect in the space 17 between the beam 1 and the inner periphery 4 of the shell 3, and means will be provided (not shown) for continuously removing such leaked fluid from the space 17.

External lines 13 are connected to each of the feedlines 12 and extend to separate respective adjusting valves 14 which are each connected by a respective branch line 15 to a main hydraulic supply line 16. The valves 14 may be actuated to permit a preselected proportion of the hydraulic pressure in the line 16 to pass to the respective line 13, and thus to the respective piston 8. The valves are controlled by signals received thereby by means of signal lines 18 from a central computer 20.

When the control signal for the valve 14 which is furthest on the left in FIG. 1 is high, then the element 8 which is furthest to the right in FIG. 1 will experience a correspondingly high pressure, so that the force applied to the shell 3 at the right hand end of the roller 10 will be correspondingly high. Thus the right hand edge of the web 11 will be subjected to a high force. In a similar way the pressure exerted by each individual element 8 can be controlled independently of the other elements 8, and by controlling the pressures exerted by the elements 8 appropriately a particular linear or nip pressure pattern can be established over the entire width of the web 11.

Figure 2:
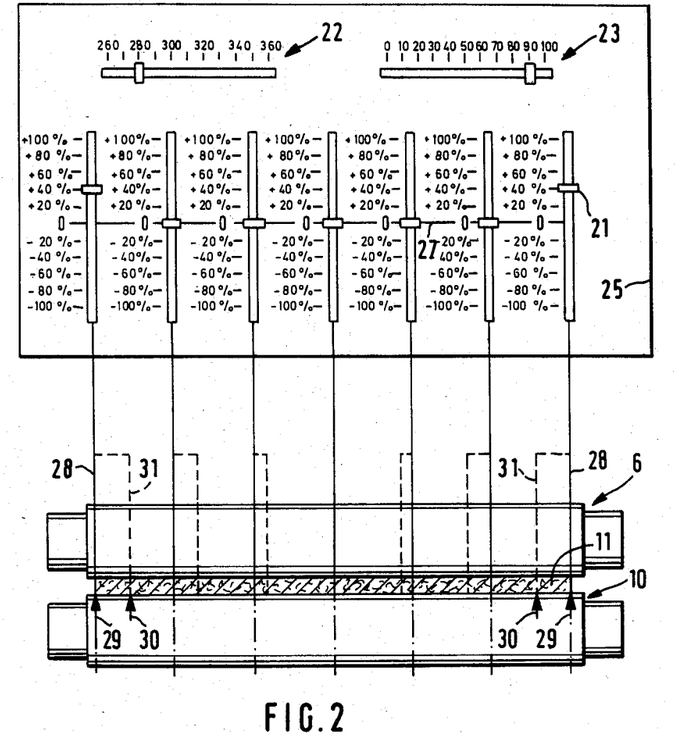
FIG. 2 is a diagrammatic view of the control panel and the rolls of an apparatus in accordance with the present invention.

Desired pressure values to be exerted at various points in the web may be selected by means of a control panel 25, which is shown most clearly in FIG. 2 of the accompanying drawings. The control panel 25 has seven control elements 21 each in the form of a variable resistance actuated by a sliding knob. The knobs are located beside one another and can be moved in parallel directions. Each adjusting element 21 is associated with particular places across the web which are disposed at uniform intervals from one another, for example, in the particular embodiment, places where the elements 8 are provided. Depending upon the width of the web, the places may in certain cases be relatively far apart from one another, and in other cases may be close together. Thus the spacing between the said places is adjusted in dependence upon the width of the web. The elements 21 may be used to programme a desired pressure profile into the computer 20 which generates the control signals passed down the signal lines 18.

Associated with each element 21 is a scale, and the scale is marked with the percentage proportion of the average value of the linear or nip pressure that will be applied to a zone of the nip adjacent the said places when the element 21 is located adjacent the relative mark. Thus each place may be subjected to average pressure, greater than average pressure, or less than average pressure.

With the elements 21 set as shown in FIG. 2, the pressure applied to the edge zones of the web will be higher than the pressure applied to the central zone of the web, which will be subjected to a substantially uniform pressure over the web width. The adjustment of the elements 21 gives an approximate reproduction of the pattern of linear pressure over the web width, but it is to be appreciated that the linear pressure will not change in a step-like manner, but instead will vary in a continuous or smooth manner over the width of the web.

In the described embodiment of the invention the width of the web which is to be treated is specified by means of an adjusting element 22 which is also in the form of a sliding resistance having a knob movable past a scale indicating the width of the web in centimetres. Also, in the described embodiment of the invention, the adjustments of the element 21 adjust the proportion of the pressure applied at the selected places, whereas a linear pressure setting element 23, again in the form of a variable resistor having a knob slidable adjacent a scale, can be utilised to set the standard pressure to be applied by the roll, that is to say the pressure applied by each of the members 8 if all the adjustment elements 21 are located at their central positions.

When an adjusting element 21 is in a position corresponding to a certain percentage above the average pressure, this will result in the associated piston 8 being subjected to a correspondingly increased hydraulic pressure, while a control element 21 set at a lower level corresponds to a hydraulic pressure lower than the average value being provided to the corresponding piston 8. The control panel 25 is connected by means of an appropriate cable 26 to the central computer 20.

The computer 20 is programmed to respond to the indicated width of the web to be treated, and the pressures to be applied thereto and calculates the hydraulic pressure to be applied to each of the elements 8, taking into account various pre-programmed items of information such as the bending properties of the shell 3, the number arrangement and construction of the elements 8, etc. The appropriate signals then pass through the lines 18 to the valves 14 so that the desired specific hydraulic pressures are applied to the various elements 8, thus resulting in the desired nip pressure being applied to the web. The pattern set by the elements 21 is applied, by the described apparatus, to webs of different widths and thus, if the web is utilised which is only wide enough to overlie six of the pressure applying elements 8, those six elements will be utilised to provide the required pressure profile to the web, and the remaining two pressure exerting elements 8 will be actuated as necessary to maintain the end portions of the shell 3 at a desired position.

It will be appreciated, therefore, that the overall linear pressure pattern is always the same even though the width of the web may vary.

In the described embodiment a display screen 24 is provided to enable a visual check to be made on the applied pressure. The values 21' generated by the elements 21 and the calculated pressure profile, calculated as the best approximation by the computer 20 through the agency of a mathematical computing model on the basis of possible adjustments of the roll 10 (determined by the roll construction and the deformability of the shell 3) are compared in the form of a bar chart or some other form of representation.

When a web of different width is utilised, then, assuming that conditions are in other respects the same, the linear pressure pattern determined by the element 21 would, in an ordinary event, not be obtained. However, the central computer 20 comprises a part 40 which responds to any changes in the signal indicating the width of the web. When the signal varies, the computer re-calculates the pressure that need to be applied to the various elements 8 to provide the desired effect.

FIG. 2 is another view of the control panel 25, but to an enlarged scale. As can be seen the element 22 can be utilised to indicate the width of the web that is to be treated, and the element 23 can be utilised to set up the linear pressure in da N/cm. The linear pressure is the total force operative the nip per centimeter of roll length, that is to say in the case of a uniform linear pressure, the force operative in the nip over the whole operative length of the roll, divided by the operative roll length in centimeters. However, the linear pressure is often not uniform so that the force applied per centimetre of roll length at various places of the roll may vary.

A pressure selected by means of the element 23 corresponds to the pressure on the zero line 27 of each of the elements 21. When any element 21 is on the zero line, the pressure set by means of the element 23 is operative at the corresponding part of the paper web. In the embodiment illustrated, this is the case with the five inner adjusting elements 21 which, as indicated by the element 23, will be subjected to a pressure of da N/CmOn the other hand, the two outer adjusting elements are at a setting of +40%. At that part of the web width which corresponds to the two outer elements 21' i.e. at the two edges of the web' the pressure is therefore $90 + (40\% \times 90) = 126$ da N/cm.

The association between the elements 21 and particular parts of the web 11 is illustrated at the bottom part of FIG. 2. The outer elements are associated with the edge of the web 11. The association is symbolised by solid lines for the case of the web edge being at a place 29. If the web is narrower so that its edge is disposed, for instance, at a place 30, the association is symbolised by a chain line 31. Similar considerations apply if webs are utilised which are even narrower, as indicated by the corresponding chain lines shown in FIG. 2.

In any specific web the distances between the selected adjacent places at which pressure is controlled will be identical to one another, but as the distances between these places will differ as compared in a narrow web and a broad web. Consequently, the required linear pressure pattern determined by the position of the elements 21 applies to webs of different widths.

The pressures exerted by the various elements 8, which are of course fixedly disposed in the roll 10, are determined by the computing part 40 of the computer which controls the pressures exerted by the elements 8 in accordance with the web widths by the means of the element 22 and thus the computer is responsible for transferring to the actual roll 10 a pressure pattern determined for any web width by the elements 21.

It is to be appreciated that an embodiment of the invention may be modified so that a property of the web, as it leaves the nip, is measured at selected positions extending tranversely of the web. The measured property may be the thickness of the web, the moisture content of the web, or the like. The measured information will enable a "property profile" to be created, and means may be provided for comparing this measured "property profile" with a predetermined desirable property profile. The result of this comparison may be fed to the computer which constitutes the control signal generating means, so that the applied pressure may be adjusted in such a way that the web passing through the nip emerges with a property profile which is as close as possible to the desired property profile. If such an arrangement is utilised it may be possible to omit the slider elements controlling the percentage of the average pressure that is to be applied at the various locations in the web.

In the embodiment of FIGS. 1 and 2 the required actual linear or nip pressure pattern is adjusted by means of the elements 21. The operator of the roll arrangement will know detailed pattern requirements from experience. For example, in the case of a paper calendering device the papermaker knows how he must select the pressure pattern in order to obtain a sheet of uniform thickness which may be wound to form a uniform coil. The coil is then further checked in certain circumstances and the linear pressure pattern set by means of the elements 21 is then adjusted manually.

Figure 3:
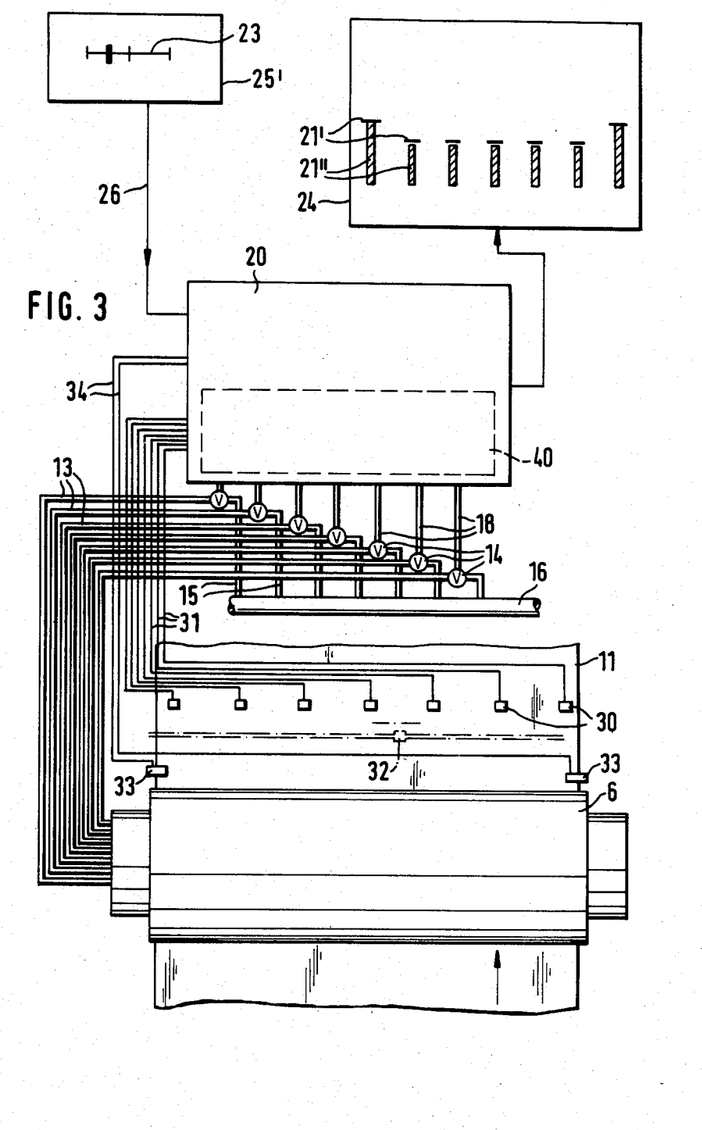
FIG. 3 is a view similar to FIG. 1 of a second embodiment of the invention, the roll pair being viewed from above.

FIG. 3 shows another embodiment wherein the web 11 is a paper web which is given surface treatment in the roll arrangement 6, 10 and is required to produce a sheet of very uniform thickness. Unlike the embodiment shown in FIGS. 1 and 2, the effect of the treatment provided by the roll arrangement 6, 10 is checked by thickness-measuring devices 30, a number of which are distributed over web width and which measure the thickness of the web issuing from the roll arrangement 6, 10 at positions spaced transversely to the axis of the sheet. The thickness measuring devices 30 input their signals by way of lines 31 into the computer 20.

The computer 20 contains a program which is based on the relationship between actual web thickness and the correspondingly necessary pressure provided by the discrete supporting elements. Consequently, when the thickness at any place supervised by a thickness measuring device 30 deviates from the set value, the computer calculates the pressures to be exerted by the discrete elements 8 in order to restore the required thickness distribution.

Instead of a number of stationary thickness-measuring devices being provided, a single such device 32 adapted to reciprocate transversely to the web 11 can be used; it is shown in chain lines in FIG. 3 and inputs the thickness signal to the computer 20 either continuously or at particular places.

Another feature of the embodiment of FIG. 3 is that a measuring device is provided comprising two detectors 33 for determining the position of the web edges. Thus the detectors automatically measures the width of the web, the resulting signals being input to the computer 20 by way of lines 34.

In this embodiment the operating panel 25' comprises merely the adjusting element 23 for the required linear pressure level, it being unnecessary to adjust the linear pressure pattern, the same being in this embodiment an interval value of the computer 20, which value arises automatically from the program in dependence upon the indication of the devices 30.

Also, in the embodiment of FIG. 3 there is no web width adjusting element 22 since the detectors 33 now detect web width automatically.

An important feature of this embodiment, however, is that the computer 20, operating in dependence upon the width determined by the detectors 33, adapts the pressures for the discrete supporting elements automatically—i.e., so that, for example, the pressures at the outer such elements decrease when the web narrows.

I claim:

1. A method of controlling the linear or nip pressure distribution in a roll arrangement adapted for the pressure treatment of a web of material, said roll arrangement comprising at least one roll comprising a stationary beam extending axially of the roll and having a shell rotatable therearound, the shell being mounted relatively to the beam by means of a plurality of supporting elements spaced consecutively along the beam and adapted to apply pressure to the shell to control the line or nip pressure of the roll arrangement, said method including the step of determining a pressure profile to be applied to the web, and providing signals representative of the profile to control signal generating means, to generate signals to control the pressure applied to the web by the supporting elements, and including the step of indicating the width of the web to the means which produce the control signals so that the control signal producing means will automatically create appropriate control signals having regard to the width of the web.

2. A method according to claim 1 wherein the pressure profile to be applied to the web is programmed into the control signal generating means.

3. A method according to claim 2, wherein the programming is achieved by operating a plurality of hand-actuated control elements to select the pressure to be applied at predetermined positions spaced transversely across the web.

4. A method according to claim 1 comprising the step of measuring the property of the web at predetermined positions spaced transversely across the web after it has passed through the nip of the roll arrangement to establish a measured property profile, and automatically calculating therefrom the pressure profile to be applied to the web.

5. A method according to any one of claims 1 to 4, wherein the width of the web is indicated to the control signal producing means by actuating a hand-operated control element.

6. A method according to any one of claims 1 to 4, wherein the width of the web is automatically measured by sensor means which produce a signal representative of the width of the web, said signal being passed to the control signal producing means.

7. Apparatus for controlling the linear nip or pressure distribution in a roll arrangement for the pressure treatment of webs of material, said arrangement comprising at least one roll having a stationary beam extending axially of the roll and a shell rotatable therearound, the shell being mounted relatively to the beam by means of a plurality of supporting elements spaced consecutively along the beam and adapted to apply pressure to the shell to control the line or nip pressure of the roll arrangement, the apparatus further comprising means for determining a pressure profile to be applied to the web, means for providing signals representative of the profile to a control signal generating means, adapted to generate signals to control the pressure applied to the web by the supporting elements, and means for indicating the width of the web to the control signal producing means, the control signal producing means being adapted to create appropriate control signals automatically having regard to the width of the web.

8. An apparatus according to claim 7 wherein means are provided for pre-programming of the profile to be applied to the web.

9. An apparatus according to claim 7, wherein said pre-programming means comprise a plurality of elements which may be positioned to indicate the pressure to be applied to respective regions of the web.

10. An apparatus according to claim 9, wherein said elements comprise slidable elements which are disposed one beside the other to move in parallel directions so that the slidable elements provide a visual representation of the pressure to be applied to the web when the slidable elements are in position.

11. An apparatus according to claim 7, wherein means are provided for measuring a property of the web at predetermined positions spaced transversely across the web to establish a measured property profile, and means are provided for automatically calculating therefrom the pressure profile to be applied to the web.

12. An apparatus according to any one of claims 7 to 11, wherein the means for indicating the width of the web to the control signal producing means comprise a hand-operated control element.

13. An apparatus according to any one of claims 7 to 11, wherein the means for indicating the width of the web to the control signal producing means comprise sensor means which automatically measure and produce representative of the width of the web, said signals being passed to the control signal producing means.

14. An apparatus according to any one of claims 7–11, wherein means are provided for adjusting the basic linear pressure to be applied, said control signal generating means generating signals which effect local variations of the applied linear pressure.

15. An apparatus according to any one of claims 7–11, wherein display means are provided on which the pressures applied at predetermined regions of the web may be visually represented.

* * * * *

UNITED STATES PATENT AND TRADEMARK OFFICE
CERTIFICATE OF CORRECTION

PATENT NO. : 4,644,860

DATED : February 24, 1987

INVENTOR(S) : Bernhard Brendel

It is certified that error appears in the above-identified patent and that said Letters Patent is hereby corrected as shown below:

In the Abstract, line 1, change "applied" to --supplied--; line 5, insert --and-- after "generated".

Column 2, line 36, delete "which"; line 42, change "." (period) to --,-- (comma).

Column 3, line 17, change "handactuated" to --hand-actuated--; line 33, change "menas" to --means--; line 60, insert --to-- after "profile"; line 68, change "reqard" to --regard--.

Column 5, line 51, change "forms" to --form--.

Column 7, line 25, change "adjacent" to --along--.

Column 8, line 11, change "pressure" to --pressures--; line 18, insert --in-- after "operative"; line 33, change "N/CmOn" to --N/Cm. On--.

Column 9, line 56, change "measures" to --measure--.

Claim 13, line 5, insert --signals-- after "duce".

Signed and Sealed this

Sixth Day of October, 1987

Attest:

DONALD J. QUIGG

Attesting Officer

Commissioner of Patents and Trademarks